April 26, 1949. G. G. LANDIS 2,468,372
FLUX ELEMENT FOR USE IN ARC WELDING
Filed March 17, 1945 2 Sheets-Sheet 1
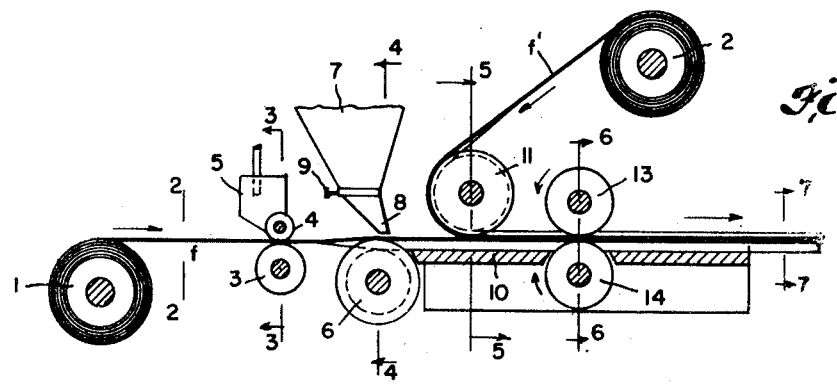
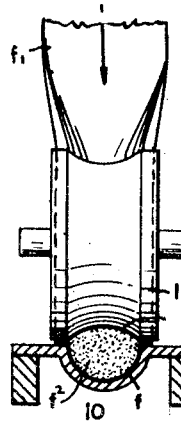
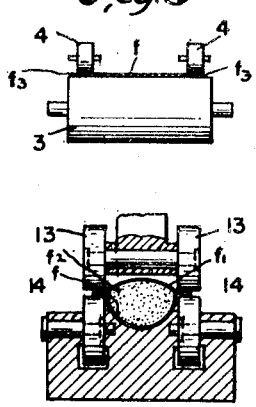
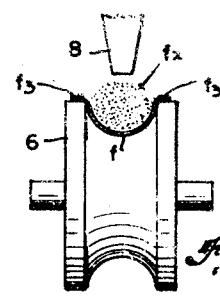
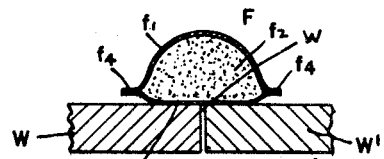
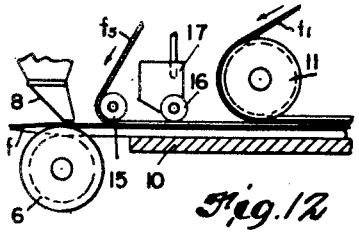
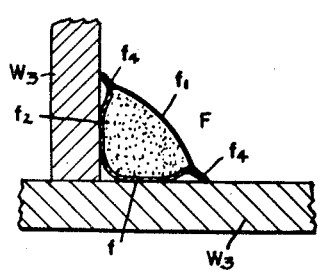
INVENTOR.
GEORGE G. LANDIS
BY
Oberlin & Limbach
ATTORNEYS April 26, 1949.  G. G. LANDIS  2,468,372
FLUX ELEMENT FOR USE IN ARC WELDING
Filed March 17, 1945  2 Sheets-Sheet 2

INVENTOR.
GEORGE G. LANDIS
BY
Oberlin & Limbach
ATTORNEYS

Patented Apr. 26, 1949

2,468,372

UNITED STATES PATENT OFFICE 2,468,372

FLUX ELEMENT FOR USE IN ARC WELDING

George G. Landis, South Euclid, Ohio, assignor to The Lincoln Electric Company, Cleveland, Ohio, a corporation of Ohio Application March 17, 1945, Serial No. 583,289

14 Claims. (Cl. 219—8)

In the pending application of G. G. Landis et al., filed January 20, 1945, Serial No. 573,700, there is disclosed an improved method for arc welding in which there is placed on the work a layer of fluxing material of a depth sufficient to submerge the arc during the welding operation, such layer being initially in the form of a tubular casing, consumable at the temperature of the welding operation, and containing a body of the selected fluxing material. The use of a flux element having this form presents a marked improvement over present methods of providing flux to the arc welding operation, viz. in the form of a coating on the welding electrode or weld rod which melts down as such electrode or rod is consumed, or in the form of a layer of powdered or granular material deposited as a layer or windrow in advance of the arc along the line to be welded.

We have now discovered that by making certain changes in the form of the tubular casing which forms a part of the aforesaid flux element not only is the latter rendered much more convenient and efficient in use, but capable of manufacture at a considerably increased rate of speed and decreased cost of production. In addition, our present improved flux element at the same time lends itself readily to the incorporation therein of diverse fluxing ingredients, including materials which are capable of serving as lateral dams for the main body of flux after the latter has been rendered molten by the action of the arc.

To the accomplishment of the foregoing and related ends, said invention, then, consists of the means hereinafter fully described and particularly pointed out in the claims.

The annexed drawing and the following description set forth in detail several methods and products exemplifying the invention, such disclosed procedure and products constituting, however, only a few of various applications of the principle of the invention.

In said annexed drawing:

Fig. 1 is a diagrammatic representation of an apparatus adapted to carry out the improved method of making a flux element of the type described, and particularly one having the improved form which characterizes the present invention;

Fig. 2 is a transverse section of one of the components of the tubular flux container at a preliminary stage in the operation of making such element, the plane of such section being indicated by the line 2—2, Fig. 1;

Figure 13:
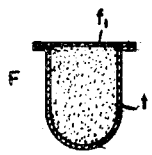
Figure 14:
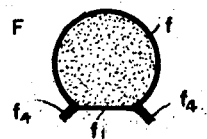
Figure 15:
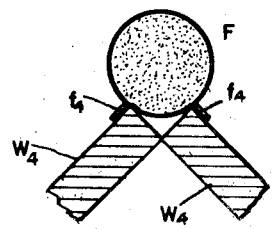
Figure 16:
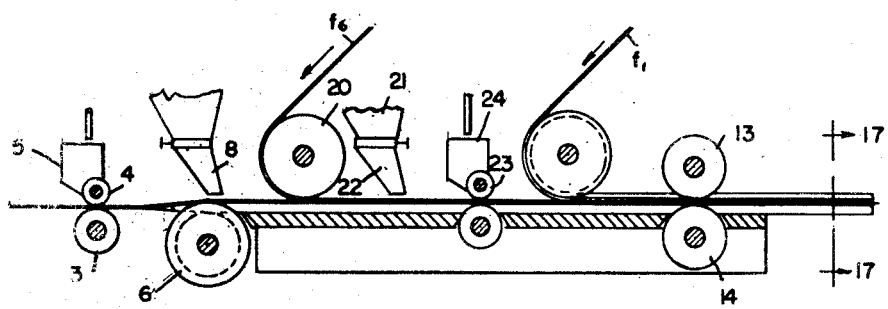
Figure 17:
Figure 18:
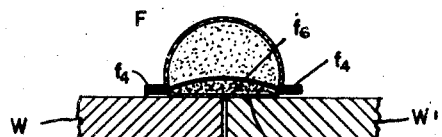
Figure 19:
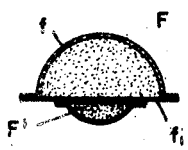
Figure 20:
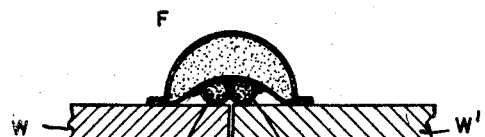

Figs. 3, 4, 5 and 6 are transverse sections of the apparatus taken on the plane indicated by the line 3—3, 4—4, 5—5 and 6—6, respectively, Fig. 1, showing successive later stages in the manufacture of such flux element, it being noted that Figs. 4 and 5 are on a somewhat larger scale than Fig. 1 and the other sectional views just referred to;

Fig. 7 is a transverse sectional view of our improved flux element as produced by the apparatus illustrated in the preceding figures, as indicated by section 7—7, Fig. 1;

Fig. 8 illustrates such improved flux element, similarly in cross-section, as applied to two plates or other parts which are to be welded together in abutting relation;

Fig. 9 is a view similar to that of Fig. 8 but showing the condition of the flux element as initially affected by the welding operation;

Fig. 10 is likewise a view similar to that of Fig. 8, showing the manner in which the fluxing element is applied in the welding together of angularly related plates or other parts;

Fig. 11 is a sectional view similar to that of Fig. 7 but illustrating a modified form of the flux element;

Fig. 12 is a diagrammatic view of an apparatus similar to that of Fig. 1 but showing certain changes therein adapting the same for the production of the modified flux element illustrated in Fig. 11;

Fig. 13 is a transverse sectional view similar to that of Fig. 7 but showing a form of flux element as produced by the apparatus illustrated in Fig. 1, where the upper component strip of the casing is considerably narrower than the lower;

Fig. 14 is a view similar to that of Fig. 13 but showing such modified element in its reverse position as it would be applied to the work;

Fig. 15 illustrates the same as applied to work for use with which such element is particularly designed;

Fig. 16 is a diagrammatic representation of an apparatus similar to that shown in Figs. 1 and 12 but designed to produce still another form of the present improved flux element;

Fig. 17 is a view corresponding to Fig. 7 of such last-mentioned element as produced by the apparatus of Fig. 16;

Fig. 18 is a view corresponding to Fig. 8, illustrating such element applied to the work;

Fig. 19 is a transverse sectional view of a further modification of such last illustrated form of element; and Fig. 20 is a similar view of still another modification thereof shown as applied to the work.

As in the case of the flux element disclosed in the above-identified pending application, the present element comprises essentially a thin walled, tubular casing of a material that is consumable at the temperature of the welding operation, and a body of flux contained within said casing, said element being longitudinally flexible and also transversely flexible to conform with the contacting surface of the work-piece whereon it is placed. Various materials have been found suitable for such casing; thus it may be made of thin paper or equivalent cellulosic material such as cellophane, of which latter a sheet as thin as .001 inch has been found satisfactory. Also light weight crepe paper and various kinds of woven cotton and other fabrics, although more expensive, will serve for the purpose. In addition, numerous other materials, and particularly synthetic rubber substitutes and light synthetic plastics which are capable of being formed into thin sheets having the necessary degree of flexibility, may be satisfactorily employed in the making of such casing or integument for the flux so long as such material has no deleterious effect on the weld.

In the aforesaid pending application there are also disclosed several methods of filling a casing such as described, with the flux which generally and preferably will be of dry finely divided or granular form, although this is not necessarily the case. A considerable number of fluxes, particularly of such dry finely divided or granular form suitable for use in arc welding operations are known and currently available on the market, and any one of these may be utilized in making the present improved flux element, the present invention being independent of the particular composition of such flux.

The methods of filling the casing thus previously proposed involved taking a length of tubing, either preformed or in the course of formation, and filling the same from the end, or else taking a strip of material and folding the same up into tubular form as a layer of flux is deposited thereon. We have now discovered that by taking two such strips of material, forming one or both of them into longitudinally extending tube sections, placing therebetween the layer of flux and then bringing such sections together with outwardly directed overlying wings or ribs, not only is the operation of filling the tubular casing greatly facilitated, but a number of advantageous features are at the same time added to the flux element itself.

One illustrative method for carrying out the manufacture of such improved flux element is illustrated in Figs. 1 to 6 inc., in which the casing of the element F is formed of two longitudinally extending sections $f$ and $f'$ between which, when secured together as will now be described, the body $f^2$ of flux is contained (see Fig. 7). The component sections $f$ and $f'$ of the casing are initially in strip form and may be drawn continuously for any desired length from rolls 1 and 2 respectively, such first roll being located below and the second above the plane in which the several operations involved in forming the finished flux element are carried out.

The first step in the apparatus as illustrated is the application to the upper surface of strip $f$ adjacent its respective edges of relatively narrow layers $f^3$ of a suitable adhesive, i. e. one that having regard to the material of which the two strips are composed will cause the latter to stick together. Such application of the adhesive layers may be carried out by any well known form of apparatus, that shown comprising a lower supporting roller 3 across and in contact with the top of which the strip $f$ passes, and two smaller rollers 4, 4 which contact with the lateral marginal portions of the strip which are to be coated with the adhesive the latter being supplied to the rollers from a tank or container 5.

In the next step the strip $f$ is brought into contact with a circumferentially grooved roller 6 of the general form illustrated in Fig. 4, such roller having cylindrical lateral edges which correspond approximately in width with the width of the layers of adhesive deposited along the margins of the strip by rollers 4. The relation of this roller 6 to the path of travel of strip $f$ is such that the central portion of the strip will be drawn down into the circumferential groove on said roller with its longitudinal portions resting on the cylindrical marginal sides of the roller. At this point the flux $f^2$ is deposited as a continuous stream in the trough-like depression which the strip $f$ thus presents. The flux may be thus supplied by any suitable means, such as a hopper 7, with a downwardly directed spout 8 through which the flow of flux is controlled by a slidable gate 9 or the like. The rate of flow of the flux, having regard to the rate of travel of the strip $f$, will be such that not only will the depression in the latter formed by roller 6 be filled, but such flux will be piled somewhat above such depression although not so high as to overflow onto the marginal edges of the strip to which the adhesive layers $f^3$ have been previously applied.

In its further progress to the right, as illustrated in Fig. 1, the strip $f$ is desirably guided and supported as by a trough-like member 10 to the point where the completed flux element is taken from the apparatus. Said support 10 (see Figs. 5 and 6) has in its upper face a central depression or trough of substantially the same cross-section as the encircling groove in roller 6 so that the strip $f$ after being formed on the latter and carrying the layer of flux deposited from hopper 7 will be conducted undisturbed through the succeeding operations. The next step is the application to such strip $f$ of the complementary strip $f'$. This is carried from the supply roll 2 around a roller 11 located a short distance above support 10 beyond flux hopper 7, as shown in Fig. 1. Roller 11, like roller 6, is formed with an encircling groove, although preferably of lesser depth, of flatter cross-sectional contour than the groove in such roller 6. Also like the latter, said roller 11 has cylindrical edge portions and these are spaced such distance apart and the axis of the roller so disposed as to bring them directly over the lateral marginal portions of strip $f$ to which adhesive layers $f^3$ have been applied. The juxtaposed lateral portions of strip $f'$ will thus be brought into contact with such adhesive layers and the two strips caused to adhere together with the body of flux $f^2$ now encased therebetween.

In order to insure adhesion of such juxtaposed marginal portions of the two strips, two pairs of rollers 13, 13 and 14, 14 will desirably be provided, these rollers being placed a short distance beyond roller 11 and so arranged as to press therebetween such juxtaposed marginal portions of the two strips which compose the assembled tubular casing. At the same time these last-mentioned rollers may be power driven at the proper rate of speed either to cause, or assist, the movement of the component strips and finished casing with its content of flux at the prescribed rate of speed.

Where the material of which the component strips of the casing are formed is a cellulosic derivative such as cellophane or other synthetic plastic which becomes sticky upon being heated, it will be unnecessary to supply to the lateral portions of strip $f$ the adhesive layers $f^3$ as described, for by suitably heating rolls 13 and 14 to the proper temperature, the effect of pressing the superposed marginal portions of the two strips as they pass through between said rolls will be to cause their adhesion to each other. It is furthermore contemplated that any suitable means, such as stitching or the like, depending upon the character of the material whereof the component strips of the casing are composed, may be employed to secure such marginal portions together in the manner described so that they will project laterally from the finished flux element as longitudinally extending laterally projecting ribs or fins $f^4$, substantially as shown in Fig. 7 and the other figures illustrating the finished flux element in cross-section.

In using a flux element F of the form and construction thus produced, where the welding operation is being carried out on a relatively flat surface, as in butt welding the edges of two flat plates or equivalent work-pieces W, W', said element will be laid along the line $w$ to be welded substantially as shown in Fig. 8, from which it will be noted that the element occupies a position the reverse of that which it occupies as it leaves the apparatus. In other words, the component strip $f'$, which is the narrower of the two and relatively flat in contour, forms the lower side of the element as thus applied. In this position the lateral ribs or fins $f^4$ will nearly, if not entirely, contact with the adjacent surfaces of the work-pieces W, W', and in any event will assist in preventing undesired rotative movement of the flux element and consequent displacement in relation to the weld line $w$.

In order to ensure that the element will remain in proper place on the work the outer face of the component strip $f'$ may have adhesive applied thereto which will cause the element in turn to adhere to such work. It would not be necessary to apply such adhesive to the entire face of strip $f'$; indeed, such application may be limited to the correspondingly directed surfaces of one or both of the ribs or fins $f^4$ and when the latter are brought into contacting relation with the work the flux element will be sufficiently adhered thereto to remain in place during the welding operation.

Such welding operation, diagrammatically illustrated in Fig. 9, is carried out substantially as described in the above-identified pending application Serial No. 573,700. In other words, after the arc has been struck between weld rod R and the work-pieces, said rod is caused to move longitudinally along the median line of the flux element as thus laid over the weld line $w$. The portion of the rod which comes in contact with the upper part of the casing of the flux element will be sufficiently heated to burn, char or melt the material of the latter (depending upon the composition of such material) along the line of such contact and thus progressively slit the casing open, and the respective side portions thereof, including the lateral ribs $f^4$, if not already in contact with the work, will tend to flatten out under the weight of the flux material. The latter will of course at the same time be rendered molten by the heat of the arc and as the casing thus flattens out it will ignite and be entirely consumed, or should there be any residual ash from the casing it will be taken up by the molten flux.

The present improved flux element lends itself admirably to so-called fillet welding, i. e. to the formation of a weld in the corner formed when two angularly related work-pieces $W^2$ and $W^3$ are brought together, as illustrated in Fig. 10. In such case that side of the flux element bounded by component strip $f$ is preferably placed in contact with the work, this side having a greater degree of curvature than the other comparatively flat side formed by component strip $f'$. By the exercise of a little pressure, the flux element may be caused substantially to fill the corner in which the fillet weld is to be formed and in this way the difficulty which has heretofore been encountered in using the submerged arc in fillet welding, owing to the tendency of granular flux material to fall away from the vertical work-piece surface, is entirely overcome. In order to ensure that the flux element will remain properly placed in the angle between the work-pieces, the appropriate faces of one or both of the laterally projecting ribs $f^4$ may be coated with adhesive as previously described so that after being brought into contact with the surface of the work the flux element will not tend to slide away.

It has not been thought necessary to illustrate the manner in which adhesive may be thus applied to either the ribs $f^4$ of the flux element or other surface thereof. This may be done as an entirely separate operation just prior to using the flux element, or such layer or layers of adhesive may be applied by means of additional rollers 4, as illustrated in Fig. 1, incidentally to the formation of the flux element.

The modified construction of flux element illustrated in Fig. 11 is identical with that previously described and shown in similar cross-section in Fig. 7, except for the inclusion of dam-forming element $f^5$, that are interposed between the marginal portions of the component strips which, when adhered together, form the lateral ribs $f^4$. These dam-forming elements may consist of narrow strips or tapes of asbestos or other material which is sufficiently more refractory than the flux body $f^2$ contained within the casing so as not to be melted as readily as the latter, or even remain more or less unaffected by the heat of the welding operation. In either event, their function it will be understood is to prevent the main body of flux when reduced to molten state from spreading laterally.

The apparatus and method previously described for making the present improved flux element lends itself readily to the incorporation in the latter of such dam-forming strips or tapes. As illustrated in Fig. 12, in which corresponding parts are numbered the same as in Fig. 1, the dam-forming strips $f^5$ will be conveniently laid by means of a pair of laterally spaced rollers 15 onto the upper faces of the marginal portions of the lower component strip $f$, to which layers $f^3$ of adhesive have been previously applied. Similar layers of adhesive are then applied to the upper faces of such strips by means of rollers 16 supplied from a tank or container 17, so that when the upper component strip $f'$ of the casing is in turn applied, its laterally projecting marginal portions will be caused to adhere to the dam-forming elements, resulting in the formation of composite laterally extending ribs or fins, as illustrated in Fig. 11.

As will be seen, the form and construction of the present improved flux element lends itself admirably to continuous production of such element in any desired length. Actually by splicing together the ends of successive rolls 2 of the component strips from which the casing is formed, the flux element may be run off from an apparatus such as illustrated in Fig. 1 to any length desired. Since such element is longitudinally flexible, it will be conveniently thus taken off from the apparatus in the form of a coil by means of a suitable reel (not shown), the element being severed when a coil of sufficient length is formed and a fresh coil then started. In using the element in a welding operation, such length or lengths thereof as may be required to cover particular stretches of weld line may then be drawn and severed from such a coil. In order thus to cut off a desired length of the flux element it is merely necessary for the user to bend the element at the desired point so as to force the flux contained within the casing away from such point and then sever the strip with a pair of shears. Where the casing is formed of a plastic material, such as previously described, which becomes soft upon application of heat, the blades of the shears may be brought to the proper temperature preliminarily to the cutting operation and they will then be effective not only to sever the casing, but seal off the severed ends, and thus prevent the escape of the flux from the casing at such ends. It is of course also entirely practicable simply to tie up the severed end with a suitable piece of cord or like tying element or to seal such end off with an adhesive strip folded over the end. The means just described for sealing the severed ends of a length of the flux element taken from a coil may of course be likewise utilized in sealing the several ends of the continuous element as it comes from the machine after a sufficient length thereof has been reeled up into a coil.

Numerous other modifications of the present improved flux element may be made in order to adapt the same for use in particular welding operations, and several such are illustrated in the figures of the drawing which remain to be described.

Thus in Fig. 13 a flux element F is shown in which the one component strip $f$ of the casing is considerably narrower than the other strip $f'$. It will be understood that a casing of this conformation may be readily made by means of the apparatus illustrated in Fig. 1 by simply employing a trough-like member of appropriate deeper and narrower contour.

When a flux element thus formed is reversed for use in an arc welding operation, the longitudinally extending ribs or fins $f^4$ thereon, instead of lying in a common plane, will tend to project laterally therefrom in approximately radial directions. Accordingly such element is adapted to be seated in the angular space between the ends of work-pieces $w^4$, $w^4$ disposed in upwardly directed angular direction, as illustrated in Fig. 15, with such ribs or fins resting against the edges of the work-pieces and thus insure the retention of the flux element in proper position for the welding operation.

Under certain welding conditions it may be desirable to place over the line to be welded a plurality of layers of flux or of other materials which will have a beneficial effect on the welding operation, as for example, alloying ingredients in addition to fluxing material proper such as previously described. The present improved flux element is readily adapted to provide such a plurality of diverse ingredients along the weld line by modifying the construction of the element as illustrated in Figs. 17 and 18. Such modified form of the element may be conveniently described by describing the manner of its formation, which is illustrated in Fig. 16. The latter, as previously noted, shows a modified form of apparatus that is in general similar to that shown in Fig. 1 for making the simple form of flux element first hereinabove described, and the parts of the apparatus which are common to both are designated by similar reference numerals. In other words, the modification consists in the provision of an additional roller 20 by means of which a third strip $f^6$ of casing material is incorporated as an intermediate web or diaphragm between component strips $f$ and $f'$. In the apparatus, following such roller 20, an additional hopper 21 with spout 22 is interposed whereby a second layer of flux or other material may be deposited on such interposed casing strip $f^6$. Layers of adhesive are then applied to the upper faces of the marginal portions of such casing component $f^6$ by means of rollers 23 supplied from a tank or container 24 similar in all respects to rollers 4 and tank 5 so that when the casing component $f'$ is thereupon applied and the casing as a whole with its two contained layers of flux or other filling material is thereupon passed between rollers 13 and 14, the marginal portions of the component strips will be caused to adhere together to form longitudinally extending laterally projecting ribs or fins $f^4$, just as before.

The last deposited layer of material, particularly where it consists of an alloying ingredient such as powered nickel or chromium, or a mixture of the two, will be relatively small compared with the first deposited layer of flux material proper. Accordingly, when the completed flux element is reversed and placed on work-pieces W, W', as illustrated in Fig. 18, such smaller layer will directly overlay the weld line $w$ and during the progress of the welding operation, which will be carried out just as previously described, such alloying ingredient or ingredients will be melted down under the protective covering provided by the fused superposed flux layer as the latter is fused, and such ingredients incorporated into the weld.

Instead of including directly in the flux element such additional ingredient or ingredients by employing such an interposed web or diaphragm, said ingredients may be incorporated in a second flux element F'' (see Fig. 19) and the latter then adhered or otherwise attached to the under side of a flux element F substantially of the first hereinabove described and illustrated in Figs. 7 and 8. The manner of using this modified form will be substantially the same as that illustrated in Fig. 18. It is also entirely practicable to utilize one or more supplemental elements $F^2$ and $F^3$ (see Fig. 20) thus containing other ingredients such as the alloying ingredients previously referred to, without attaching the same to the main flux element F. Thus, as illustrated in the figure last referred to, such supplemental elements $F^2$ and $F^3$, respectively containing powdered nickel and chromium, may be laid along the weld line $w$ between the work-pieces W and W', and a flux element substantially as illustrated in Figs. 7 and 8 then placed thereover. Upon carrying out the welding operation the effect will be substantially that described in connection with the form of element illustrated in Figs. 18 and 19.

It will be understood that in connection with any of these later described modified forms of flux element, dam-forming elements $f^5$ may be incorporated if found desirable, in the same manner as illustrated in Figs. 11 and 12.

While primarily designed to facilitate the application of flux to the weld line in an arc welding operation, the present improved element as has been made clear by the foregoing description will serve equally efficaciously to introduce other weld beneficiating ingredients such as alloying metals or the like into the welding operation. Accordingly, the term "flux" as employed herein it will be understod is not a term of limitation to ingredients such as silicates or the like which constitute a flux in the strict sense of the word, but any such weld beneficiating ingredient, including alloying metals which may be incorporated in the weld metal produced by the action of the arc, are intended to be included.

The provision of alloying ingredients in the form of powdered metal, or compounds which may be reduced to metallic form by the action of the arc, as an element which may be laid along the weld line in advance of the welding operation presents a number of advantages over other methods of introducing alloying ingredients into the weld. Thus heretofore it has been usual to employ a weld rod of special composition for use in connection with the welding of each particular kind of alloy work-piece that might be encountered, thus making it necessary to maintain in stock even in the user's hands a considerable variety of such weld rods. It is of course important that the alloy ingredients be properly gauged, and for this reason their introduction, apart from the weld rod in which they can be incorporated in predetermined proportions, has involved the risk that too much or too little of the alloying ingredients would be provided. However, by the present improved means and method whereby the alloying ingredient is placed within a consumable casing it is rendered possible to introduce any prescribed amount of such ingredient uniformly along the weld rod.

Other modes of applying the principle of my invention may be employed instead of those explained, change being made as regards the products and methods herein disclosed, provided the step or steps stated by any of the following claims or the equivalent of such stated step or steps be employed.

I therefore particularly point out and distinctly claim as my invention:

1. A flux element for use in arc welding comprising a thin walled, tubular casing of a material that is consumable at the temperature of the welding operation, and a body of flux contained within said casing, the latter being formed with a longitudinally extending, lateral rib having no flux content and occupying a predetermined fixed position on said casing.

2. A flux element for use in arc welding comprising a thin walled, tubular casing of a material that is consumable at the temperature of the welding operation, and a body of flux contained within said casing, the latter being formed with two oppositely directed, longitudinally extending, lateral ribs having no flux content and occupying a predetermined fixed position on said casing.

3. A flux element for use in arc welding comprising a thin walled, tubular casing of a material that is consumable at the temperature of the welding operation, a body of flux contained within said casing, the latter being formed with a longitudinally extending, lateral rib, and a dam-forming element of relatively more refractory material than said flux carried by such rib.

4. A flux element for use in arc welding comprising a thin walled, tubular casing of a material that is consumable at the temperature of the welding operation, a body of flux contained within said casing, the latter being formed with two oppositely directed, longitudinally extending, lateral ribs, and a dam-forming element of relatively more refractory material than said flux carried by each of said ribs.

5. A flux element for use in arc welding comprising a thin walled, tubular casing of a material that is consumable at the temperature of the welding operation, and a body of flux contained within said casing, the latter being formed of plural, transversely curved strips having juxtaposed marginal portions secured together to provide longitudinally extending, lateral ribs on said casing.

6. A flux element for use in arc welding comprising a thin walled, tubular casing of a material that is consumable at the temperature of the welding operation, and a body of flux contained within said casing, the latter being formed of two transversely curved strips having juxtaposed marginal portions secured together to provide longitudinally extending, lateral ribs on said casing, the curvature of one such strip being less than that of the other.

7. A flux element for use in arc welding comprising a thin walled, tubular casing of a material that is consumable at the temperature of the welding operation, and a body of flux contained within said casing, the latter being formed of two transversely curved strips having juxtaposed marginal portions secured together to provide longitudinally extending, lateral ribs on said casing, the one such strip being of less transverse width than the other.

8. A flux element for use in arc welding comprising a thin walled, tubular casing of a material that is consumable at the temperature of the welding operation, and a body of flux contained within said casing, the latter being formed of plural, transversely curved strips having juxtaposed marginal portions secured together to provide longitudinally extending, lateral ribs on said casing, and dam-forming elements of relatively more refractory material than said flux interposed between such marginal portions of the strip.

9. A flux element for use in arc welding comprising a thin walled, tubular casing of a material that is consumable at the temperature of the welding operation, and a body of flux contained within said casing, the latter being formed with two longitudinally extending lateral ribs having no flux content and projecting in predetermined fixed angularly related, approximately radial directions from said casing.

10. A flux element for use in arc welding comprising a thin walled, tubular casing of a material that is consumable at the temperature of the welding operation, and a body consisting substantially entirely of granular alloying ingredient contained within said casing.

11. A flux element for use in arc welding comprising a thin walled, tubular casing of a material that is consumable at the temperature of the welding operation, and a body consisting substantially entirely of powdered alloying metal contained within said casing.

12. A flux element for use in arc welding comprising a thin walled, tubular casing of a material that is consumable at the temperature of the welding operation, and plural bodies consisting substantially entirely of weld-beneficiating ingredients contained within said casing, said bodies being respectively of different composition.

13. A flux element for use in arc welding comprising a thin walled, tubular casing of a material that is consumable at the temperature of the welding operation, and plural bodies consisting substantially entirely of weld-beneficiating ingredients contained within said casing, said bodies being separated by a transverse diaphragm, one such body consisting of flux and another consisting substantially entirely of granular alloying ingredient.

14. A flux element for use in arc welding comprising a thin walled, tubular casing of a material that is consumable at the temperature of the welding operation, and plural bodies of weld-beneficiating ingredients contained within said casing, said bodies being respectively of different composition, said casing being formed of plural exterior strips and an interior strip, said strips having juxtaposed margins secured together to provide longitudinally extending, lateral ribs on said casing, and said bodies being respectively confined in the spaces between said strips.

GEORGE G. LANDIS.

REFERENCES CITED

The following references are of record in the file of this patent:

UNITED STATES PATENTS

| Number | Name | Date |
|---|---|---|
| 2,016,585 | Basore | Oct. 8, 1935 |
| 2,043,960 | Jones et al. | June 9, 1936 |
| 2,145,009 | Keir | Jan. 24, 1939 |
| 2,241,572 | Armstrong | May 13, 1941 |
| 2,257,823 | Stokes | Oct. 7, 1941 |
| 2,331,689 | Hodge | Oct. 12, 1943 |
| 2,331,937 | Schreiner | Oct. 19, 1943 |